(12) United States Patent
Okada

(10) Patent No.: US 7,133,178 B2
(45) Date of Patent: Nov. 7, 2006

(54) IMAGE FORMING APPARATUS AND IMAGE FORMING METHOD

(75) Inventor: Masanori Okada, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 11/354,381

(22) Filed: Feb. 15, 2006

(65) Prior Publication Data
US 2006/0181757 A1    Aug. 17, 2006

(30) Foreign Application Priority Data
Feb. 17, 2005    (JP)    ............... 2005-040497

(51) Int. Cl.
G02B 26/08    (2006.01)
B41J 27/00    (2006.01)

(52) U.S. Cl. ................... 359/213; 359/900; 346/107.3; 347/260

(58) Field of Classification Search ............... None
See application file for complete search history.

(56) References Cited

U.S. PATENT DOCUMENTS 5,122,644 A * 6/1992 Hasegawa et al. ..... 235/462.26

2006/0017795 A1 * 1/2006 Normura et al. ............ 347/232

FOREIGN PATENT DOCUMENTS

JP    9-52387    2/1997

* cited by examiner

Primary Examiner—James Phan
(74) Attorney, Agent, or Firm—Gerald E. Hespos; Anthony J. Casella

(57) ABSTRACT

A printer has a laser emitter for emitting a laser beam to irradiate a surface of a photosensitive member; a reflector for reflecting the laser beam to a target position on the photosensitive member; a driver for moving the reflector; a resolution changeover designation acceptor for accepting a designation on a low resolution or a high resolution as a resolution for image formation; and an emission controller for controlling the laser emitter to emit the laser beam along a scanning line in a forward direction or a scanning line in a backward direction defined by the movement of the reflector driven by the reflective mirror driver if the designated resolution is the low resolution, and for controlling the laser emitter to emit the laser beam along the scanning line in the forward direction and the scanning line in the backward direction if the designated resolution is the high resolution.

3 Claims, 4 Drawing Sheets

IMAGE FORMING APPARATUS AND IMAGE FORMING METHOD

BACKGROUND OF THE INVENTION

1. Field of the Invention

The present invention relates to an image forming apparatus for forming an image with use of laser light, and an image forming method for use in the image forming apparatus.

2. Description of the Related Art

Heretofore, there has been generally used a laser scanner equipped with a rotary polygon mirror in an image forming apparatus such as a copier, a printer, or a fax. In the image forming apparatus, the interval of scanning lines can be decreased by increasing the rotation number of the rotary polygon mirror, which enables to increase the number of scanning lines per unit time, thereby enhancing the resolution in the sub-scanning direction. Also, the resolution in the sub-scanning direction can be enhanced by decreasing the moving speed i.e. the rotating speed of a photosensitive member. Japanese Unexamined Patent Publication No. 09-52387 recites an image forming apparatus equipped with a galvano mirror in place of a rotary polygon mirror. The image forming apparatus performs image formation with an increased scanning speed by reciprocal scanning, namely, by causing the galvano mirror to swing back and forth or reciprocate within a certain angular range at a fixed cycle. The image forming apparatus enables to change the resolution in the sub-scanning direction by changing the moving speed of the galvano mirror or the rotating speed of the photosensitive member.

In the image forming apparatus with the increased rotation number of the rotary polygon mirror, various drawbacks, resulting from the increase of the rotation number of the rotary polygon mirror, may occur such as increase of a noise, shortening of the useful life of a motor, or required use of a costly motor. Also, a clock for outputting image data is required to be increased, which may lead to unduly increase of radiation. When the rotating speed of the photosensitive member is decreased, the printing speed may be decreased. Further, in the image forming apparatus with the increased rotation number of the rotary polygon mirror, and the image forming apparatus recited in the above publication, it is necessary to change the moving speed of the rotary polygon mirror, the galvano mirror, or the photosensitive member in order to change the resolution.

SUMMARY OF THE INVENTION

In view of the above problems residing in the prior art, it is an object of the present invention to provide an image forming apparatus free from the drawbacks such as increase of a noise, shortened useful life of a motor, required use of a costly motor, or lowering of the printing speed, even if the resolution in the sub-scanning direction is raised, and without a cumbersome control such as changing the moving speed of a rotary polygon mirror, a galvano mirror, or a photosensitive member in order to change the resolution in the sub-scanning direction.

An aspect of the invention is directed to an image forming apparatus comprising: a laser emitter for emitting a laser beam to irradiate a surface of a photosensitive member; a reflector, disposed at a position on a laser beam path defined by the laser emitter and the photosensitive member, for reflecting the laser beam emitted by the laser emitter to direct the reflected laser beam to the surface of the photosensitive member; a driver for reciprocatively moving the reflector in such a manner that the laser beam travels along a scanning line on the surface of the photosensitive member in a direction for scanning; a resolution designation acceptor for accepting a designation on a resolution for image formation, the resolution being a low resolution and a high resolution having a resolution twice as large as the low resolution; and an emission controller for controlling the laser emitter to selectively emit the laser beam along the predetermined scanning line in a forward direction or the predetermined scanning line in a backward direction defined by the movement of the reflector by the driver if the resolution designation acceptor accepts the low resolution as the resolution for image formation, and for controlling the laser emitter to emit the laser beam both along the scanning line in the forward direction and the scanning line in the backward direction if the resolution designation acceptor accepts the high resolution as the resolution for image formation.

In the above arrangement, in the case where the designated resolution accepted by the resolution designation acceptor is the low resolution, the emission controller controls the laser emitter to selectively emit the laser beam on the scanning line in the forward direction or the scanning line in the backward direction defined by the movement of the reflector by the driver. In the case where the designated resolution accepted by the resolution designation acceptor is the high resolution, the emission controller controls the laser emitter to emit the laser beam on the scanning line in the forward direction and the scanning line in the backward direction.

With this arrangement, in the case where the low resolution is designated, the scanning line in the forward direction or the scanning line in the backward direction is selectively used for image scanning, and in the case where the high resolution is designated, both the scanning line in the forward direction and the scanning line in the backward direction are used for image scanning. This arrangement enables to change the resolution in printing in the sub-scanning direction to the high resolution, which is twice as large as the low resolution, without the drawbacks such as increase of a noise, shortened useful life of a motor, required use of a costly motor, or lowering of the printing speed. This arrangement also eliminates a cumbersome control such as changing the moving speed of a rotary polygon mirror, a galvano mirror, or a photosensitive member in order to change the resolution in the sub-scanning direction.

These and other objects, features and advantages of the present invention will become more apparent upon reading of the following detailed description along with the accompanying drawings.

DETAILED DESCRIPTION OF THE PREFERRED EMBODIMENTS

Figure 1:
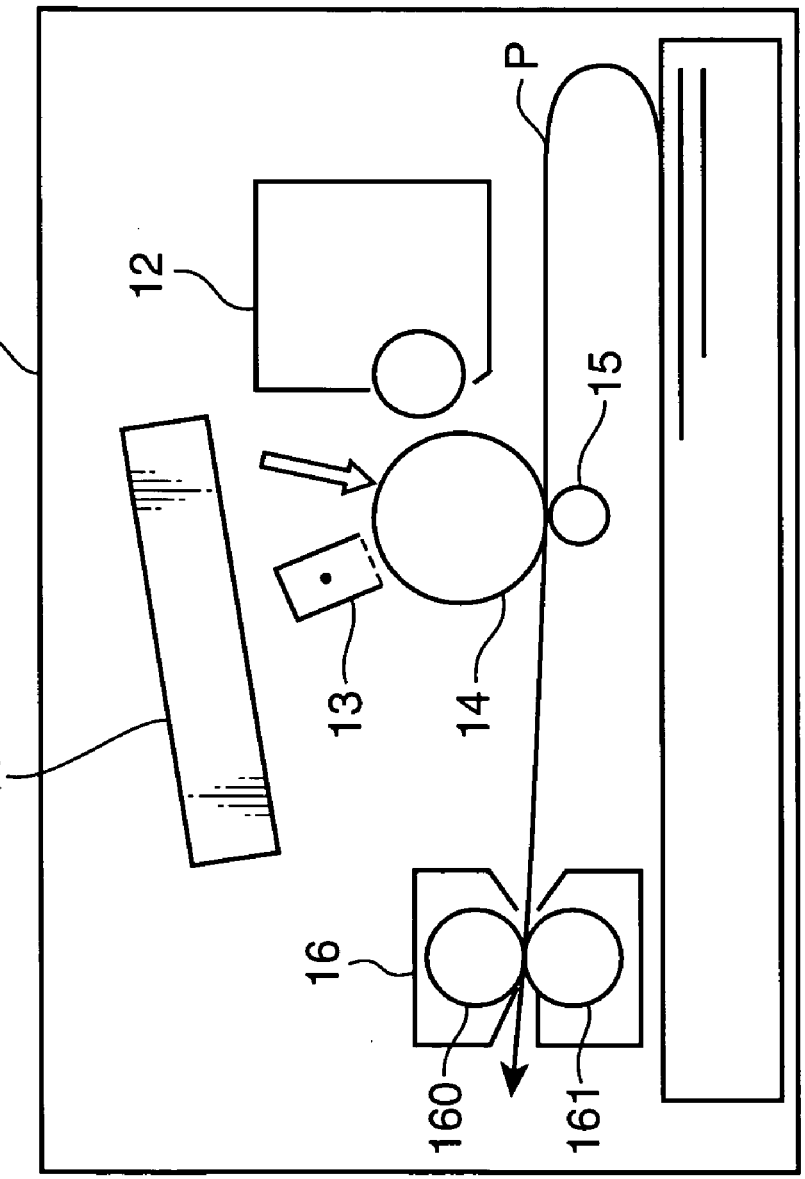
FIG. 1 is an illustration showing a mechanical construction of an image forming apparatus in accordance with an embodiment of the invention.

In the following, an embodiment of the invention is described referring to the drawings. FIG. 1 is an illustration showing a mechanical construction of a printer 1 as an example of an image forming apparatus in accordance with an embodiment of the invention. The printer 1 includes, as mechanical components, a laser scanner 11, a developer 12, a charger 13, a photosensitive drum 14, a transfer roller 15, and a fixing unit 16.

The photosensitive drum 14 is a cylindrical member, and is rotated in the clockwise direction in FIG. 1 by receiving a driving force from an unillustrated motor. The charger 13 substantially uniformly charges the surface of the photosensitive drum 14. The laser scanner 11 is provided with a light source such as a laser diode, and forms an electrostatic latent image corresponding to image data by emitting a light signal in accordance with the image data onto the surface of the photosensitive drum 14, which is substantially uniformly charged by the charger 13. Details on the laser scanner 11 will be described later referring to FIG. 2.

The developer 12 has a toner container for accommodating toner therein, and forms a toner image on the surface of the photosensitive drum 14 by supplying the toner onto the surface of the photosensitive drum 14 where the electrostatic latent image has been formed. The toner image formed on the surface of the photosensitive drum 14 is transferred onto a recording sheet or a transfer belt (not shown) transported along a transport path P by the transfer roller 15, which will be described later.

The transfer roller 15 is provided at a position opposing to the photosensitive drum 14. The transfer roller 15 is made of a rubber material or an equivalent material having conductivity to transfer the toner image formed on the surface of the photosensitive drum 14 onto the recording sheet or the transfer belt transported along the transport path P.

The fixing unit 16 includes a fixing roller 160 equipped with an internal heater or the like, and a pressure roller 161 to fix the toner images on the recording sheet by pressingly transporting the recording sheet carrying the toner images.

Now, an image forming operation with use of the printer 1 is described briefly. First, the surface of the photosensitive drum 14, serving as an image carrier, is substantially uniformly charged by the charger 13. Then, the surface of the charged photosensitive drum 14 is exposed by the laser scanner 11 serving as an exposure device to form an electrostatic latent image to be formed on a recording-sheet onto the surface of the photosensitive drum 14. The electrostatic latent image is developed into a toner image by attracting the toner onto the surface of the photosensitive drum 14 by the developer 12 serving as a developing device. The toner image formed on the surface of the photosensitive drum 14 is transferred onto the recording sheet by the transfer roller 15 serving as a transferring device. After the above operation is conducted, the toner image transferred onto the recording sheet is fixed on the recording sheet by the fixing unit 16 serving as a fixing device.

Figure 2:
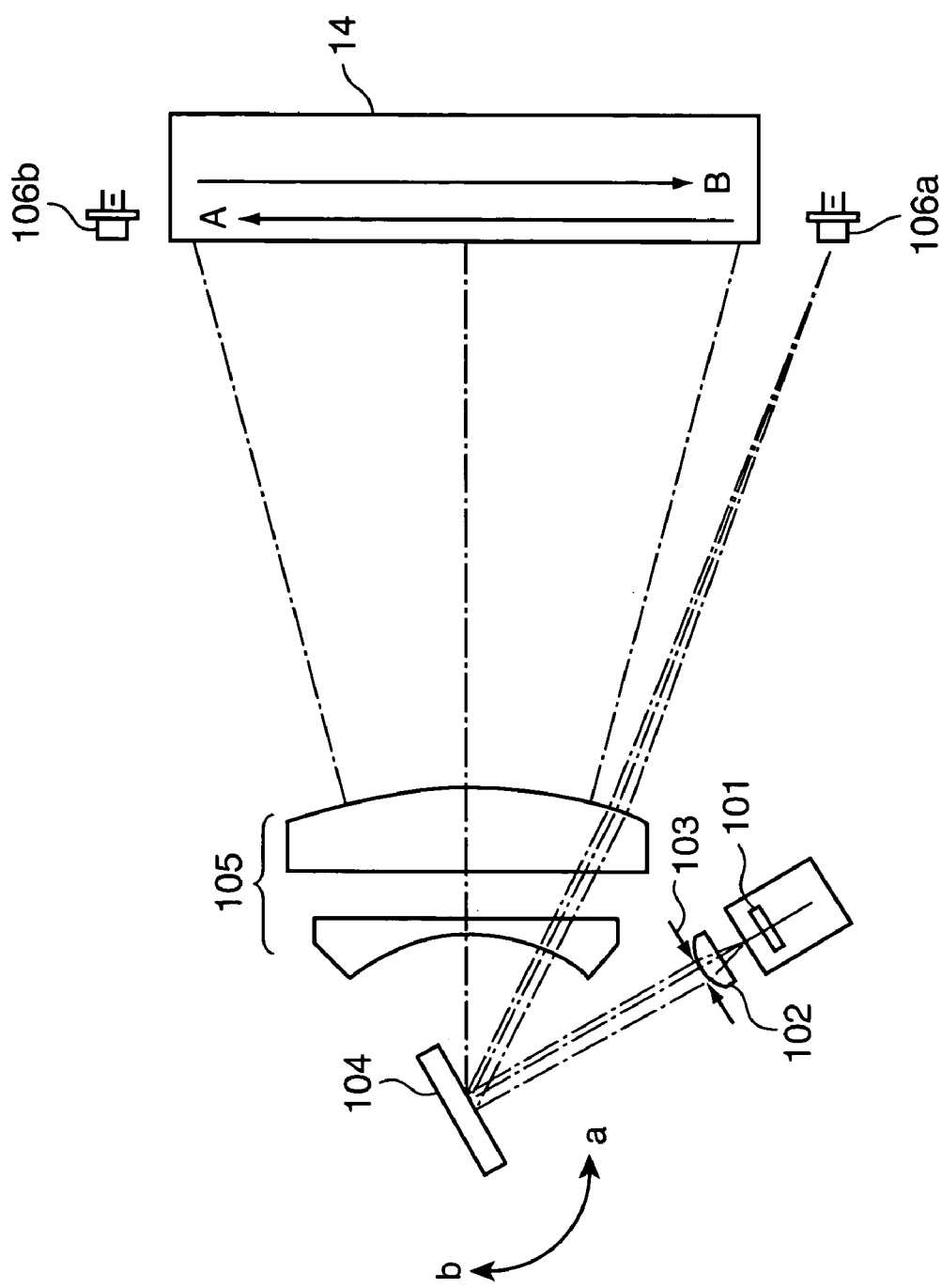
FIG. 2 is an illustration showing a mechanical construction of a laser scanner equipped in the image forming apparatus shown in FIG. 1.

FIG. 2 is an illustration showing a mechanical construction of the laser scanner 11. The laser scanner 11 includes a semiconductor laser 101, a collimator lens 102, a diaphragm 103, a reflective mirror 104, a lens group 105, and beam detection (BD) sensors 106a, 106b.

The semiconductor laser 101 generates a laser beam. The collimator lens 102 and the diaphragm 103, in cooperation to each other, collimate the laser beam emitted from the semiconductor laser 101 into substantially parallel beams. The reflective mirror 104 reflects the laser beam generated from the semiconductor laser 101 by swinging back and forth in the directions of arrows a and b to scan the laser beam in the axial direction of the photosensitive drum 14.

Specifically, in the case where the reflective mirror 104 moves in the direction of the arrow a, the laser beam is scanned in the direction of the arrow A, and in the case where the reflective mirror 104 moves in the direction of the arrow b, the laser beam is scanned in the direction of the arrow B. The lens group 105 is driven for correction so that the laser beam reflected on the reflective mirror 104 is scanned at a constant speed relative to the surface of the photosensitive drum 14.

The beam detection sensor 106a, 106b is a sensor for detecting the laser beam reflected on the reflective mirror 104. A detection signal outputted from the beam detection sensor 106a, 106b is used to synchronize the movement of the reflective mirror 104 and image data writing. The beam detection sensor 106a is used to synchronize the movement of the reflective mirror 104 with image data writing in the direction of the arrow A, and the beam detection sensor 106b is used to synchronize the movement of the reflective mirror 104 with image data writing in the direction of the arrow B.

Figure 3:
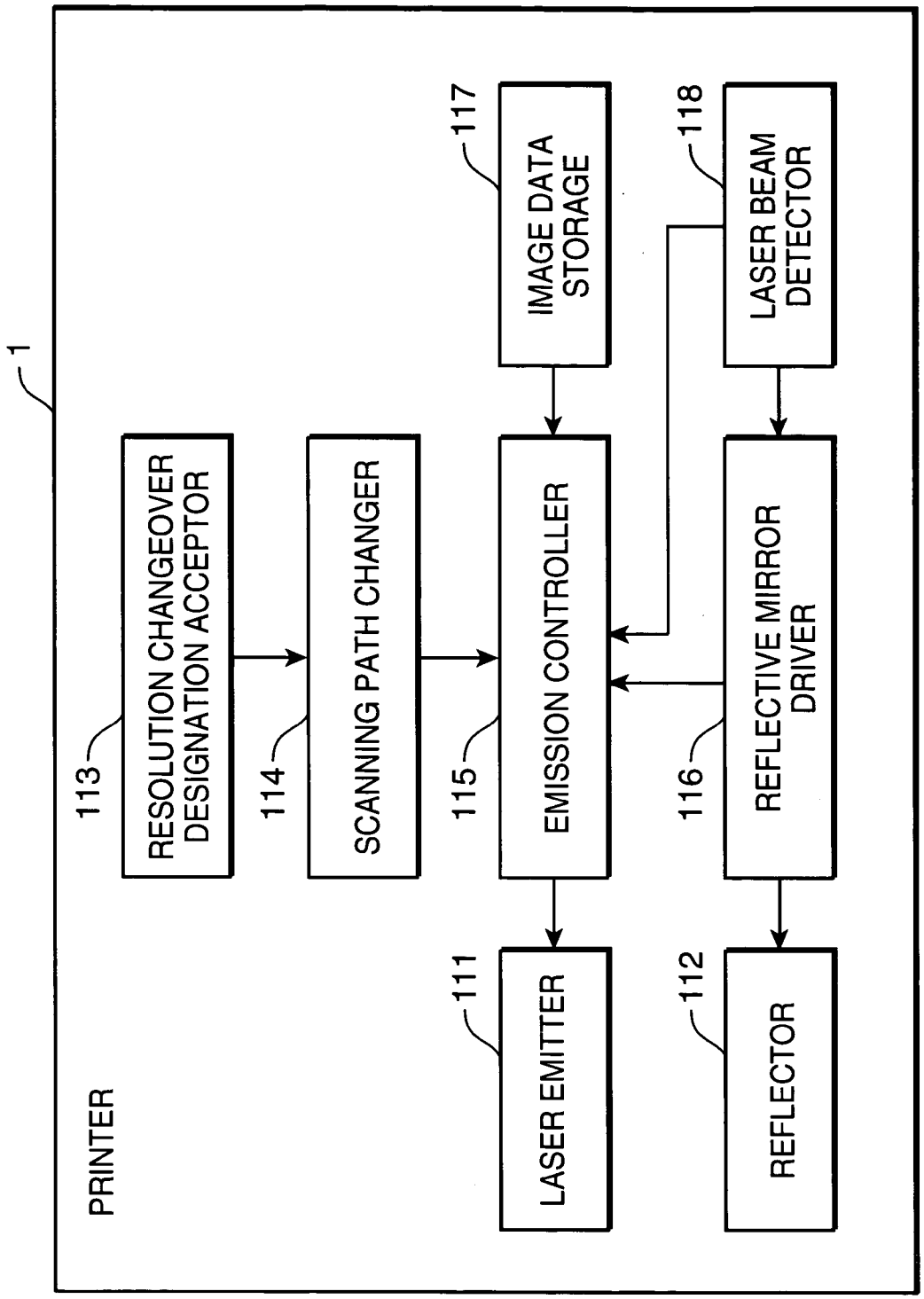
FIG. 3 is a block diagram showing a functional arrangement of the image forming apparatus shown in FIG. 1.

Now, a functional arrangement of the printer 1 in accordance with the embodiment of the invention is described. FIG. 3 is a block diagram showing the functional arrangement of the printer 1 in accordance with the embodiment. The printer 1 functionally includes a laser emitter 111, a reflector 112, a resolution changeover designation acceptor 113, a scanning path changer 114, an emission controller 115, a reflective mirror driver 116, an image data storage 116, and a laser beam detector 118.

The laser emitter 111 corresponds to the semiconductor laser 101, and the reflector 112 corresponds to the reflective mirror 104. The laser beam detector 118 corresponds to the beam detection sensors 106a, 106b. In the case where the laser beam detector 118 corresponding to the beam detection sensors 106a, 106b detects a laser beam, the laser beam detector 118 sends a detection signal indicative of the detection to the emission controller 115 and to the reflective mirror driver 116. The image data storage 117 stores therein image data for image formation. The image data storage 117 includes a random access memory (RAM), for instance. The image data stored in the image data storage 117 is data that has been sent from an information processor such as a personal computer (PC) connected to the printer 1, and received by the printer 1.

The resolution changeover designation acceptor 113 accepts, with use of an operation unit (not shown) provided in the printer 1 or a personal computer (PC) connected to the printer 1, a user's designation on a resolution i.e. a high resolution of 1,200 dpi or a low resolution of 600 dpi, and sends information concerning the designated resolution to the scanning path changer 114.

The scanning path changer 114 discriminates whether the scanning is performed merely in the forward direction or the backward direction, or both in the forward direction and the backward direction, based on the designated resolution information sent from the resolution changeover designation acceptor 113. If the received designated resolution information represents 600 dpi i.e. the low resolution, the scanning path changer 114 sends, to the emission controller 115, a command indicating a one-way scanning mode of scanning merely the predetermined scanning line in the forward direction or the backward direction. If, on the other hand, the received designated resolution information represents 1,200 dpi i.e. the high resolution, the scanning path changer 114 sends, to the emission controller 115, a command indicating a two-way scanning mode of scanning both in the forward direction and the backward direction.

The reflective mirror driver 116 causes the reflector 112 corresponding to the reflective mirror 104 to reciprocate, with use of a motor serving as a drive source, for example. The reflective mirror driver 116 changes the moving direction of the reflective mirror 104 in a direction opposite to the current moving direction thereof in response to receiving a detection signal from the laser beam detector 118.

The emission controller 115 controls the laser emitter 111 to emit a laser beam corresponding to image data, based on the image data stored in the image data storage 117. The emission controller 115 controls the laser emitter 111 to selectively emit the laser beam on a scanning line in a forward direction or a scanning line in a backward direction if the one-way scanning mode is designated based on the designation sent from the scanning path changer 114, and controls the laser emitter 111 to emit the laser beam on the scanning line in the forward direction and the scanning line in the backward direction if the two-way scanning mode is designated based on the designation sent from the scanning path changer 114. The emission controller 115 executes the above control operation synchronously with the writing operation of the respective scanning lines based on the detection signal outputted from the laser beam detector 118.

Figure 4:
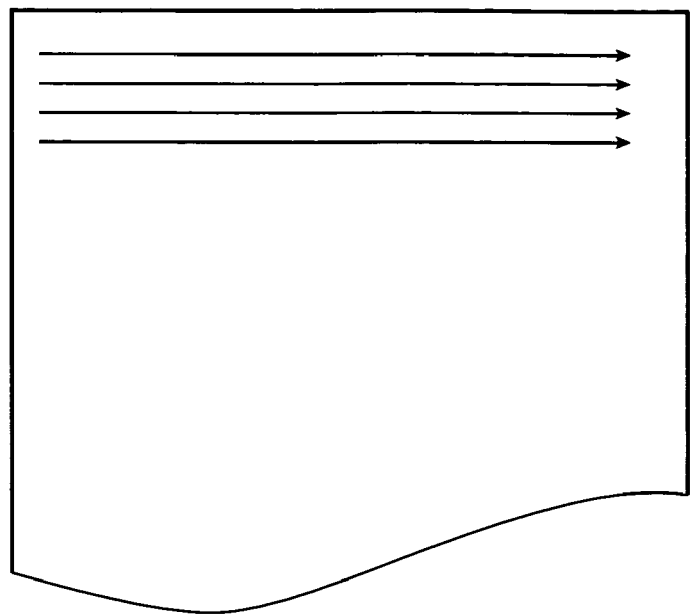
FIG. 4 is an illustration showing a concept on scanning lines on a recording sheet in the embodiment of the invention in the case where scanning is performed merely in the forward direction.
Figure 5:
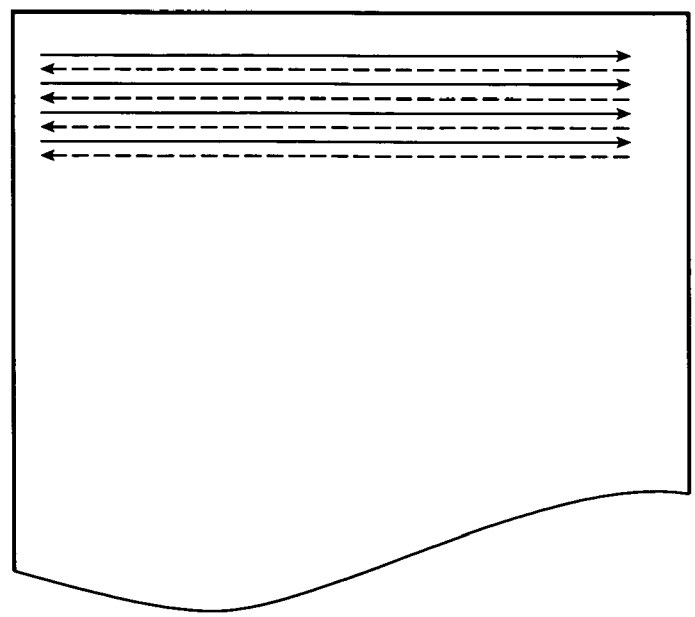
FIG. 5 is an illustration showing a concept on scanning lines on a recording sheet in the embodiment of the invention in the case where scanning is performed both in the forward direction and the backward direction.

FIG. 4 is an illustration showing a concept on scanning lines on a recording sheet in the case where scanning is performed merely in a forward direction. FIG. 5 is an illustration showing a concept on scanning lines on a recording sheet in the case where scanning is performed both in a forward direction and a backward direction. In the examples of FIGS. 4 and 5, the solid lines with the arrows thereof show scanning lines in the forward direction with the scanning direction thereof, and the dashed lines with the arrows thereof show scanning lines in the backward direction with the scanning direction thereof. The scanning line in the backward direction is scanned at the interval half of the scanning line interval of the adjacent scanning lines in the forward direction. Accordingly, the resolution of the scanning lines in the sub-scanning direction in FIG. 5 is twice as large as the resolution in FIG. 4, which is equivalent to the resolution ratio of the high resolution i.e. 1,200 dpi to the low resolution i.e. 600 dpi in the embodiment.

In the embodiment, the reciprocating reflective mirror is provided in place of a rotary polygon mirror, so that laser emission is enabled both in the forward direction and the backward direction. In the case where the low resolution is designated, scanning merely in the forward direction or the backward direction is performed without changing the oscillation frequency of the reflective mirror, and in the case where the high resolution is designated, scanning both in the forward direction and the backward direction is performed without changing the oscillation frequency of the reflective mirror. This arrangement enables to change over the resolution in the sub-scanning direction without the drawbacks such as increase of a noise, shortened useful life of a motor, required use of a costly motor, or lowering of the printing speed.

The invention is not limited to the embodiment, but is applicable to the following modifications. In the embodiment, the resolution is changed over between 600 dpi as the low resolution and 1,200 dpi as the high resolution. Alternatively, the resolutions of the high resolution and the low resolution are not limited to the above, as far as the high resolution is twice as large as the low resolution.

In the embodiment, the image forming apparatus provided with the single semiconductor laser has been described. Alternatively, the invention is applicable to an image forming apparatus provided with a semiconductor laser for each of the colors.

Also, the invention is applicable to an image forming apparatus provided with plural semiconductor lasers for each of the colors or a monochromatic color. In the modification, an emission controller controls the each one of the semiconductor lasers to selectively emit a laser beam on a scanning line in a forward direction or a scanning line in a backward direction if a scanning path changer designates a one-way scanning mode based on the designation sent from the scanning path changer, and controls the each one of the semiconductor lasers to emit the laser beam on the scanning line in the forward direction and the scanning line in the backward direction if the scanning path changer designates a two-way scanning mode based on the designation sent from the scanning path changer.

With the above arrangement, the resolution in the sub-scanning direction can be changed over in an image forming apparatus with an increased scanning speed without changing the oscillation frequency of the reflective mirror. In other words, image formation with an increased speed can be executed by changing over the resolution in the sub-scanning direction.

In the embodiment, the reflector is reciprocatively moved with use of a motor as a drive source. Alternatively, a reflective mirror may be oscillated by utilizing the resonance frequency thereof.

In the embodiment, the printer has been described as an example of the image forming apparatus. The image forming apparatus of the invention may be a copier, a fax, or a complex machine having functions of a copier and a fax, for instance. In the modification, image data for forming an image may be the one that has been read out from a document image by a document reader (not shown) provided in the image forming apparatus, or the one that has been sent from a fax transmitter connected to the image forming apparatus, and has been received by the image forming apparatus.

To summarize the invention, the invention is directed to an image forming apparatus comprising: a laser emitter for emitting a laser beam to irradiate a surface of a photosensitive member; a reflector, disposed at a position on a laser beam path defined by the laser emitter and the photosensitive member, for reflecting the laser beam emitted by the laser emitter to direct the reflected laser beam to the surface of the photosensitive member; a driver for reciprocatively moving the reflector in such a manner that the laser beam travels along a scanning line on the surface of the photosensitive member in a direction for scanning; a resolution designation acceptor for accepting a designation on a resolution for image formation, the resolution being a low resolution and a high resolution having a resolution twice as large as the low resolution; and an emission controller for controlling the laser emitter to selectively emit the laser beam along the predetermined scanning line in a forward direction or the predetermined scanning line in a backward direction defined by the movement of the reflector by the driver if the resolution designation acceptor accepts the low resolution as the resolution for image formation, and for controlling the laser emitter to emit the laser beam both along the scanning line in the forward direction and the scanning line in the backward direction if the resolution designation acceptor accepts the high resolution as the resolution for image formation.

The invention is also directed to a method for forming an image with use of an image forming apparatus designed in such a manner that a scanning line in a forward direction and a scanning line in a backward direction are scanned for image data writing by reciprocating a laser beam to be emitted, the method comprising the steps of: accepting a designation on a resolution for image formation, the resolution being a low resolution and a high resolution having a resolution twice as large as the low resolution; and selectively emitting the laser beam to a surface of a photosensitive member of the image forming apparatus along the predetermined scanning line in the forward direction or the predetermined scanning line in the backward direction if the designation on the low resolution is accepted in the designation accepting step, and emitting the laser beam to the surface of the photosensitive member both along the scanning line in the forward direction and the scanning line in the backward direction if the designation on the high resolution is accepted in the designation accepting step, the laser beam being a light signal obtained by conversion of image data.

With the above arrangements, in the case where the low resolution is designated, the scanning line in the forward direction or the scanning line in the backward direction is selectively used for image scanning, and in the case where the high resolution is designated, both the scanning line in the forward direction and the scanning line in the backward direction are used for image scanning. This arrangement enables to change the resolution in printing in the sub-scanning direction to the high resolution, which is twice as large as the low resolution, without the drawbacks such as increase of a noise, shortened useful life of a motor, required use of a costly motor, or lowering of the printing speed. This arrangement also eliminates a cumbersome control such as changing the moving speed of a rotary polygon mirror, a galvano mirror, or a photosensitive member in order to change the resolution in the sub-scanning direction.

This application is based on Japanese Patent Application No. 2005-40497 filed on Feb. 17, 2005, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus comprising:
   a laser emitter for emitting a laser beam to irradiate a surface of a photosensitive member;
   a reflector, disposed at a position on a laser beam path defined by the laser emitter and the photosensitive member, for reflecting the laser beam emitted by the laser emitter to direct the reflected laser beam to the surface of the photosensitive member;
   a driver for reciprocatively moving the reflector in such a manner that the laser beam travels along a scanning line on the surface of the photosensitive member in a direction for scanning;
   a resolution designation acceptor for accepting a designation on a resolution for image formation, the resolution being a low resolution and a high resolution having a resolution twice as large as the low resolution; and
   an emission controller for controlling the laser emitter to selectively emit the laser beam along the predetermined scanning line in a forward direction or the predetermined scanning line in a backward direction defined by the movement of the reflector by the driver if the resolution designation acceptor accepts the low resolution as the resolution for image formation, and for controlling the laser emitter to emit the laser beam both along the scanning line in the forward direction and the scanning line in the backward direction if the resolution designation acceptor accepts the high resolution as the resolution for image formation.

2. The image forming apparatus according to claim 1, wherein
   the laser emitter includes a plurality of laser light sources, and
   the emission controller controls each one of the laser light sources to selectively emit the laser beam along the predetermined scanning line in the forward direction or the predetermined scanning line in the backward direction defined by the movement of the reflector by the driver if the resolution designation acceptor accepts the low resolution as the resolution for image formation, and controls the each one of the laser light sources to emit the laser beam both along the scanning line in the forward direction and the scanning line in the backward direction if the resolution designation acceptor accepts the high resolution as the resolution for image formation.

3. A method for forming an image with use of an image forming apparatus designed in such a manner that a scanning line in a forward direction and a scanning line in a backward direction are scanned for image data writing by reciprocating a laser beam to be emitted, the method comprising the steps of:
   accepting a designation on a resolution for image formation, the resolution being a low resolution and a high resolution having a resolution twice as large as the low resolution; and
   selectively emitting the laser beam to a surface of a photosensitive member of the image forming apparatus along the predetermined scanning line in the forward direction or the predetermined scanning line in the backward direction if the designation on the low resolution is accepted in the designation accepting step, and emitting the laser beam to the surface of the photosensitive member both along the scanning line in the forward direction and the scanning line in the backward direction if the designation on the high resolution is accepted in the designation accepting step, the laser beam being a light signal obtained by conversion of image data.

* * * * *